United States Patent
Chen

(10) Patent No.: US 11,045,883 B2
(45) Date of Patent: Jun. 29, 2021

(54) COLLET ASSEMBLY OF IMPROVED STABILITY AND COLLET THEREOF

(71) Applicant: SHIN-YAIN INDUSTRIAL CO., LTD., Taichung (TW)

(72) Inventor: Pen-Hung Chen, Taichung (TW)

(73) Assignee: SHIN-YAIN INDUSTRIAL CO., LTD., Taichung (TW)

( * ) Notice: Subject to any disclaimer, the term of this patent is extended or adjusted under 35 U.S.C. 154(b) by 60 days.

(21) Appl. No.: 16/508,581

(22) Filed: Jul. 11, 2019

(65) Prior Publication Data

US 2021/0008642 A1 Jan. 14, 2021

(51) Int. Cl.
*B23B 31/20* (2006.01)
*B23B 31/107* (2006.01)

(52) U.S. Cl.
CPC ........ *B23B 31/208* (2013.01); *B23B 31/1074* (2013.01); *B23B 2231/24* (2013.01);
(Continued)

(58) Field of Classification Search
CPC ..... B23B 31/028; B23B 31/20; B23B 31/202; B23B 31/208; B23B 31/1074; B23B 2231/24; B23B 2250/12; B23B 2250/16; Y10T 279/17111; Y10T 408/76; Y10T 409/304312
See application file for complete search history.

(56) References Cited

U.S. PATENT DOCUMENTS 3,841,645 A * 10/1974 Parsons ................. B23B 31/208
279/46.6
4,943,071 A * 7/1990 Srebot ..................... B23B 31/16
279/110
(Continued)

FOREIGN PATENT DOCUMENTS

DE 10157450 A1 * 6/2003 ......... B23Q 11/1023
FR 2817181 A1 * 5/2002 .......... B23B 31/202
(Continued)

OTHER PUBLICATIONS

Machine Translation, WO 2017/064312, Cantz, N. Apr. 20, 2017 (Year: 2017).*

(Continued)

*Primary Examiner* — Chwen-Wei Su
(74) *Attorney, Agent, or Firm* — WPAT, PC

(57) ABSTRACT

A collet assembly of improved stability has a collet, an axial limiting assembly, a cutter, a pin, and multiple damping elements. The collet has a containing space, a pin-receiving groove, a connecting groove, and multiple receiving grooves. The containing space is formed through the collet. The pin-receiving groove is formed through the collet. The connecting groove is recessed on the collet. The multiple receiving grooves are recessed in the collet. The axial limiting assembly is mounted to the collet. The cutter has a limiting groove and a mounting end. The limiting groove is recessed on the cutter. The mounting end abuts against the limiting assembly. The pin extends into the pin-receiving groove and abuts against the limiting groove of the cutter. Each one of the multiple damping elements is received in a respective one of the multiple receiving grooves of the collet. A collet of improved stability is also provided.

10 Claims, 7 Drawing Sheets

(52) U.S. Cl.
CPC ......... *B23B 2250/16* (2013.01); *Y10T 408/76* (2015.01); *Y10T 409/304312* (2015.01)

(56) References Cited

U.S. PATENT DOCUMENTS

| | | | | |
|---|---|---|---|---|
| 4,955,622 | A | * 9/1990 | Peterson | ............... B23B 31/208 |
| | | | | 279/156 |
| 10,252,346 | B2 | * 4/2019 | Boregowda | ............ B23B 31/305 |
| 2015/0321265 | A1 | * 11/2015 | Sakurai | ................ B23B 31/202 |
| | | | | 279/43.1 |

FOREIGN PATENT DOCUMENTS

| | | | | |
|---|---|---|---|---|
| GB | 1245418 A | * | 9/1971 | ........... B23B 31/202 |
| KR | 101522867 B1 | * | 5/2015 | ........... B23B 31/202 |
| WO | WO-2017064312 A1 | * | 4/2017 | ........... B23B 31/208 |
| WO | WO-2018029013 A1 | * | 2/2018 | ........... B23B 31/028 |

OTHER PUBLICATIONS

Machine Translation, WO 2018/029013, Haimer, F., Feb. 15, 2018. (Year: 2018).*

* cited by examiner

COLLET ASSEMBLY OF IMPROVED STABILITY AND COLLET THEREOF

BACKGROUND OF THE INVENTION

1. Field of the Invention

The present invention relates to a collet assembly, and more particularly to a collet assembly of improved stability and a collet thereof.

2. Description of Related Art

A conventional collet assembly comprises a collet and a cutter. The collet has a clamping hole and multiple slits. The clamping hole is formed through the collet along an axial direction of the collet. Each one of the multiple slits is formed on the collet along the axial direction of the collet. The multiple slits are disposed at equi-angular intervals, surround the clamping hole, and enable the collet to deform along a radial direction of the collet. The cutter has a mounting end and a cutting end being opposite the mounting end of the cutter. To assemble the collet and the cutter, extend the cutter into the clamping hole of the collet. Then put the collet into a positioning groove of a cutter holder. At last, make a nut pass through the collet and mount the nut to the cutter holder. The collet can clamp the cutter tightly after the collet deforms along the radial direction of the collet.

Although the collet can clamp the cutter tightly, the collet lacks a mechanism that can limit axial movement and rotation of the cutter. Therefore, the cutter moves along the axial direction of the collet and rotates relative to the collet in a machining process, which leads to poor machining accuracy. Furthermore, the collet vibrates relative to the cutter holder in the machining process. Since the cutter is clamped by the collet, the cutter also vibrates along with the collet, such that the machining accuracy is influenced. To overcome the shortcomings of the conventional collet assembly, the present invention tends to provide a collet assembly of improved stability to mitigate or obviate the aforementioned problems.

SUMMARY OF THE INVENTION

The main objective of the present invention is to provide a collet assembly of improved stability and a collet thereof.

The collet assembly of improved stability in accordance with the present invention has a collet, an axial limiting assembly, a cutter, a pin, and multiple damping elements. The collet has a containing space, a pin-receiving groove, a connecting groove, and multiple receiving grooves. The containing space is formed through the collet along an axial direction of the collet. The pin-receiving groove is formed through the collet along a radial direction of the collet and communicates with the containing space. The connecting groove is recessed on an end surface of the collet along the axial direction of the collet and communicates with the containing space. The multiple receiving grooves are recessed in the collet along the axial direction of the collet.

The axial limiting assembly is detachably mounted to the connecting groove of the collet and has an end cap and an abutted element. The end cap is detachably mounted to the connecting groove of the collet and has a containing hole. The containing hole is formed through the end cap and communicates with the containing space of the collet. The abutted element is mounted to the containing hole of the end cap, and extends into the containing space of the collet. The cutter has a limiting groove and a mounting end. The limiting groove is recessed on the cutter, communicates with the pin-receiving groove of the collet, and has an end surface disposed at one side of the limiting groove. The mounting end of the cutter abuts against the abutted element of the axial limiting assembly. The pin extends into the pin-receiving groove of the collet and abuts against the end surface of the limiting groove of the cutter. Each one of the multiple damping elements is received in a respective one of the multiple receiving grooves of the collet. The collet of improved stability in accordance with the present invention in cooperation with a cutter having a limiting groove recessed on the cutter has a containing space, a pin-receiving groove, a connecting groove, multiple receiving grooves, an axial limiting assembly, a pin, and multiple damping elements. The containing space is formed through the collet along an axial direction of the collet and is capable of containing the cutter. The pin-receiving groove is formed through the collet along a radial direction of the collet and communicates with the containing space and the limiting groove of the cutter. The connecting groove is recessed on a first end surface of the collet along the axial direction of the collet and communicates with the containing space.

The multiple receiving grooves are recessed in the collet along the axial direction of the collet. The axial limiting assembly is detachably mounted to the connecting groove of the collet and has an end cap and an abutted element. The end cap is detachably mounted to the connecting groove of the collet and has a containing hole. The containing hole is formed through the end cap and communicates with the containing space of the collet. The abutted element is mounted to the containing hole of the end cap, and extends into the containing space of the collet. The pin extends into the pin-receiving groove of the collet and abuts against the end surface disposed at one side of the limiting groove of the cutter. Each one of the multiple damping elements is received in a respective one of the multiple receiving grooves of the collet.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
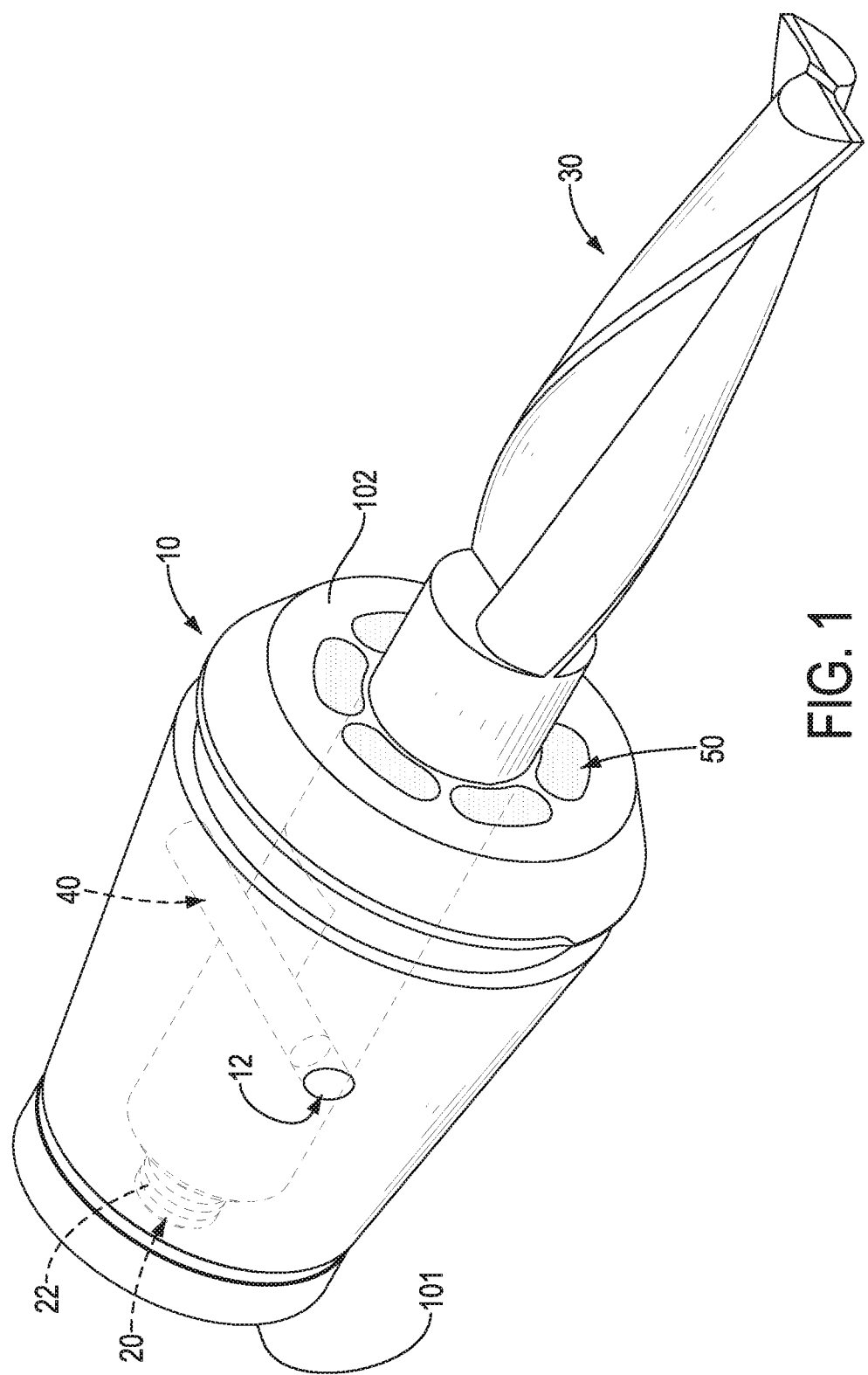
FIG. 1 is a perspective view of a first embodiment of a collet assembly of improved stability in accordance with the present invention.

With reference to FIG. 1, a first embodiment of a collet assembly of improved stability in accordance with the present invention comprises a collet 10, an axial limiting assembly 20, a cutter 30, a pin 40, and multiple damping elements 50. In the first embodiment of the present invention, the collet 10 is a water-outlet collet.

Figure 2:
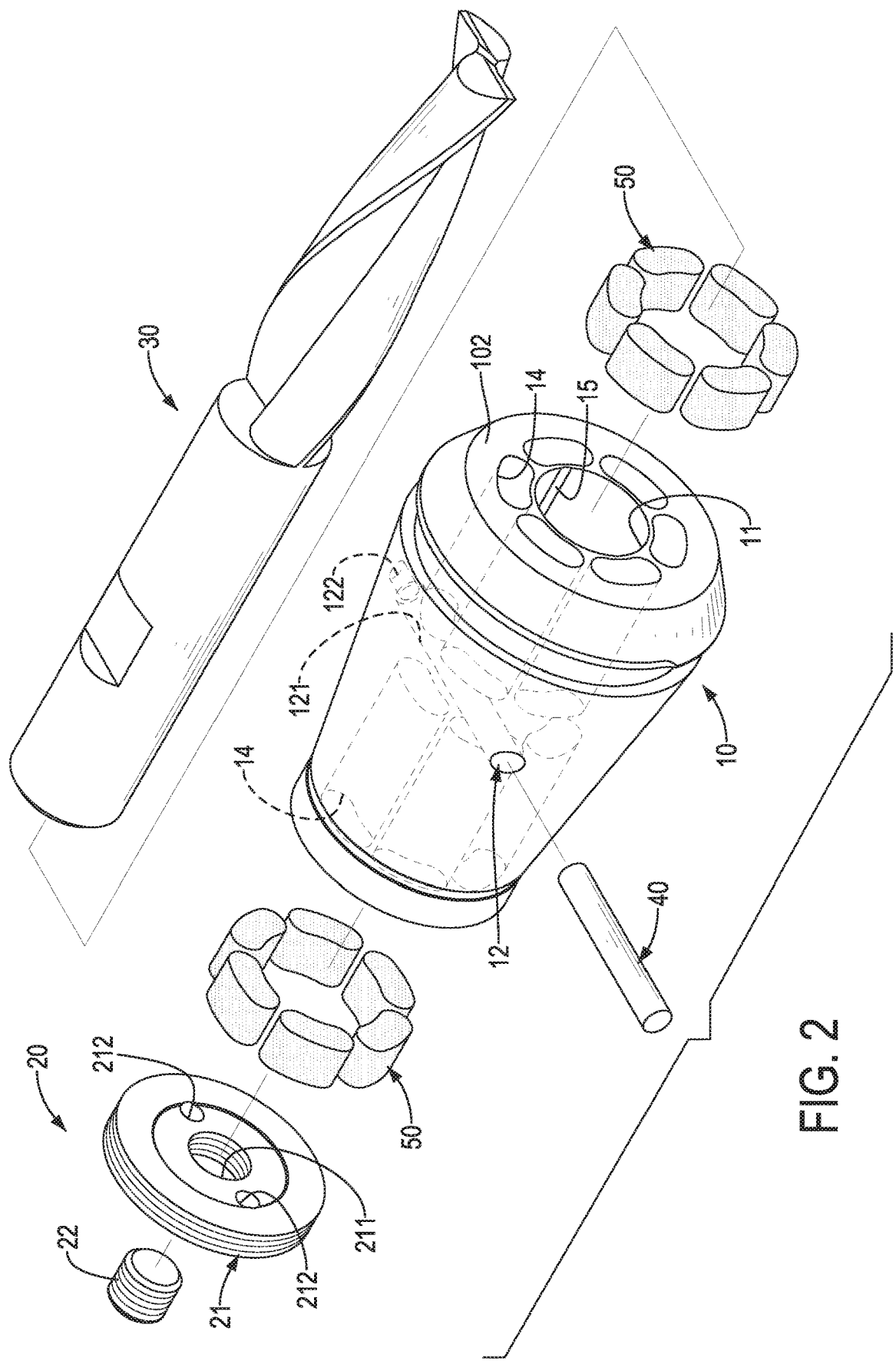
FIG. 2 is an exploded perspective view of the collet assembly of improved stability in FIG. 1.
Figure 3:
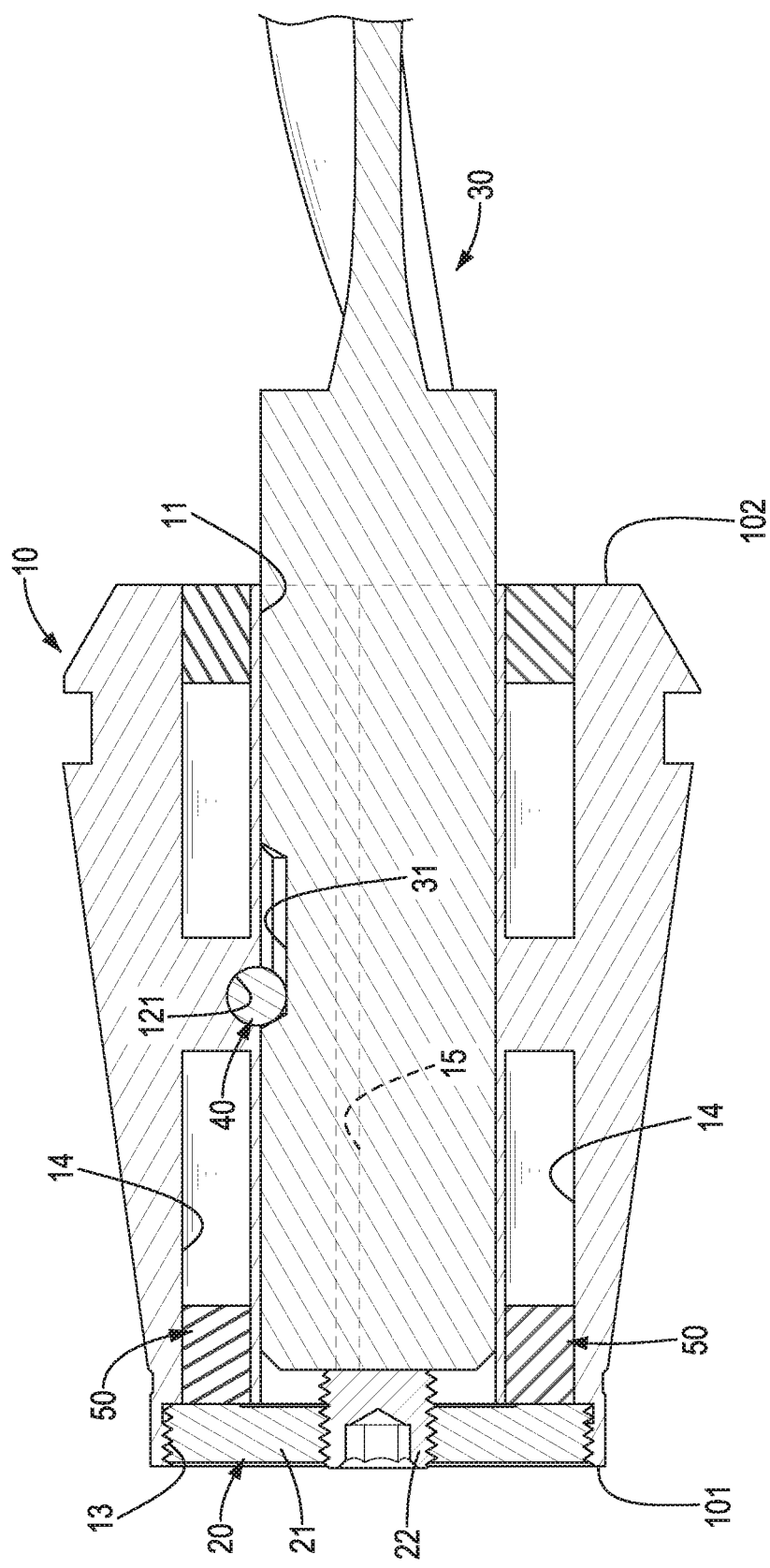
FIG. 3 is a cross-sectional side view of the collet assembly of improved stability in FIG. 1.

With reference to FIGS. 1 to 3, the collet 10 has a first end surface 101, a second end surface 102, a containing space 11, a pin-receiving groove 12, a connecting groove 13, multiple receiving grooves 14, and two coolant channels 15. The first end surface 101 and the second end surface 102 are disposed at two ends of the collet 10, respectively. The containing space 11 is formed through the collet 10 along an axial direction of the collet 10 between the two end surfaces 101, 102. The pin-receiving groove 12 is formed through the collet 10 along a radial direction of the collet 10 eccentrically, and has a pin-receiving section 121 and a venting section 122. The pin-receiving section 121 communicates with the containing space 11 and has an inner diameter. The venting section 122 communicates with the pin-receiving section 121, forms the pin-receiving groove 12 with the pin-receiving section 121, and has an inner diameter. The inner diameter of the venting section 122 is smaller than the inner diameter of the pin-receiving section 121.

Figure 4:
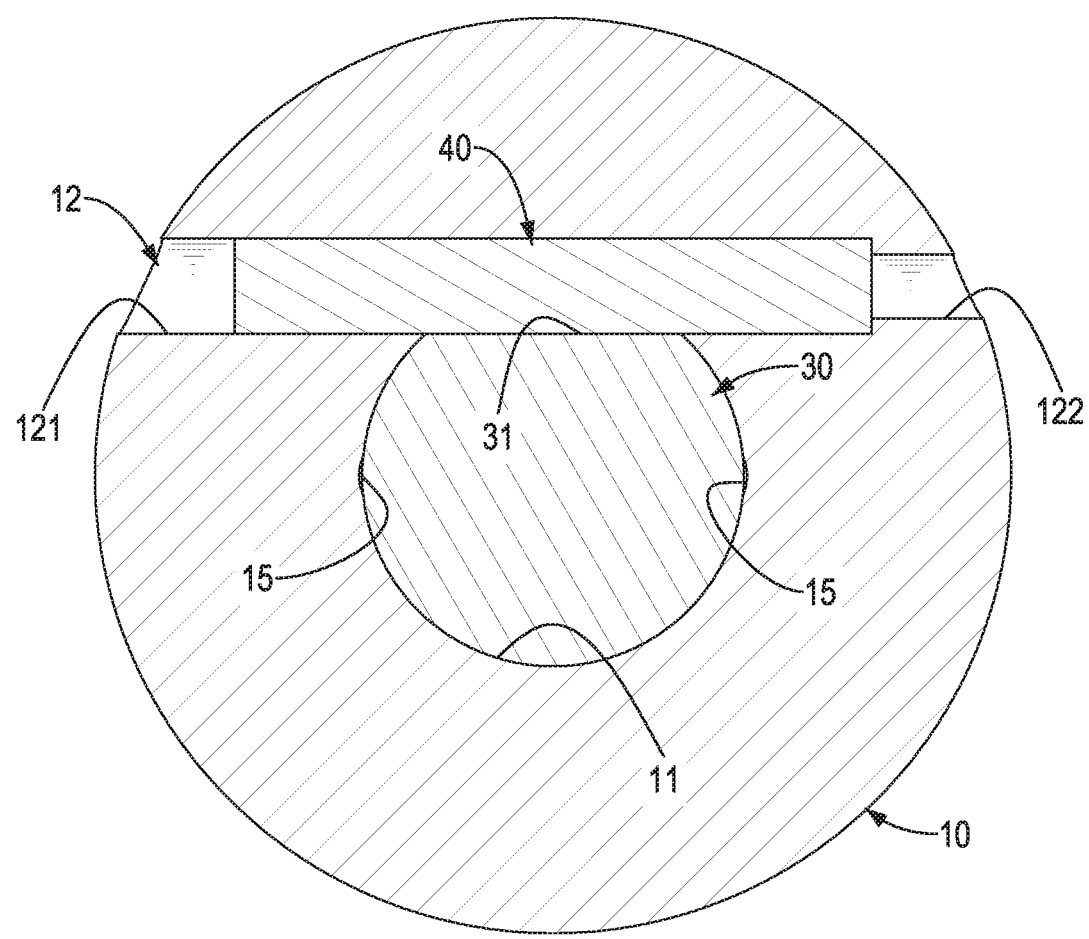
FIG. 4 is a cross-sectional front view of the collet assembly of improved stability in FIG. 1.

With reference to FIG. 3, the connecting groove 13 is recessed on the first end surface 101 of the collet 10 along the axial direction of the collet 10, and the connecting groove 13 communicates with the containing space 11. Several ones of the multiple receiving grooves 14 are recessed on the connecting groove 13 along the axial direction of the collet 10, and surround the containing space 11. The other ones of the multiple receiving grooves 14 are recessed on the second end surface 102 of the collet 10 along the axial direction of the collet 10, and surround the containing space 11. With reference to FIG. 4, the two coolant channels 15 are recessed on an inner surface of the collet 10 that surrounds the containing space 11 along the axial direction of the collet 10, communicate with the containing space 11, and are opposite each other.

With reference to FIGS. 2 and 3, the axial limiting assembly 20 is detachably mounted to the connecting groove 13 of the collet 10 and has an end cap 21 and an abutted element 22. The end cap 21 is detachably mounted to the connecting groove 13 of the collet 10, and has a containing hole 211 and two coolant holes 212. The containing hole 211 is formed through the end cap 21 and communicates with the containing space 11 of the collet 10. Each one of the two coolant holes 212 is formed through the end cap 21, communicates with the containing space 11 of the collet 10, and communicates with a respective one of the two coolant channels 15 of the collet 10. In the present invention, the two coolant holes 212 are located on two sides of the containing hole 211 respectively. The abutted element 22 is mounted to the containing hole 211 of the end cap 21, and extends into the containing space 11 of the collet 10 via the connecting groove 13. In the present invention, the abutted element 22 is a thrust screw.

With reference to FIG. 3, the cutter 30 has a limiting groove 31, a mounting end, and a cutting end. The limiting groove 31 is recessed on an outer surface of the cutter 30, and is adjacent to the mounting end of the cutter 30. The limiting groove 31 has an end surface disposed at one side of the limiting groove 31, and the end surface is adjacent to the first end surface 101 of the collet 10. The mounting end and the cutting end are located at two ends of the limiting groove 31 respectively. The cutter 30 extends into the containing space 11 of the collet 10 from the second end surface 102 of the collet 10 until the mounting end of the cutter 30 abuts against the abutted element 22 of the axial limiting assembly 20. Then rotate the cutter 30 to a position where the limiting groove 31 communicates with the pin-receiving section 121 of the pin-receiving groove 12. By having the abutted element 22 mounted to the containing hole 211 of the end cap 21 and having the cutter 30 abut against the abutted element 22, the cutter 30 is not able to move along the axial direction of the collet 10 toward the first end surface 101 of the collet 10 in a machining process. Therefore, machining accuracy of the cutter 30 is enhanced.

With reference to FIGS. 2 to 4, the pin 40 extends into the pin-receiving section 121 of the pin-receiving groove 12 and abuts against the end surface of the limiting groove 31 of the cutter 30. Since the inner diameter of the venting section 122 is smaller than the inner diameter of the pin-receiving section 121, the pin 40 will not extend into the venting section 122. As the pin 40 abuts against the end surface of the limiting groove 31 of the cutter 30, the pin 40 limits rotation of the cutter 30. Thereby, the pin 40 is capable of preventing the cutter 30 from rotating in the machining process, such that machining accuracy of the cutter 30 is enhanced.

With reference to FIGS. 1 and 2, each one of the multiple damping elements 50 is received in a respective one of the multiple receiving grooves 14 of the collet 10, and the multiple damping elements 50 surround the cutter 30. The multiple damping elements 50 provide a shock-absorbing effect to the collet assembly of improved stability. In this way, the multiple damping elements 50 prevent vibrations of the collet 10 that may lower the machining accuracy of the cutter 30 in the machining process. In the present invention, each one of the multiple damping elements 50 is flexible.

Figure 5:
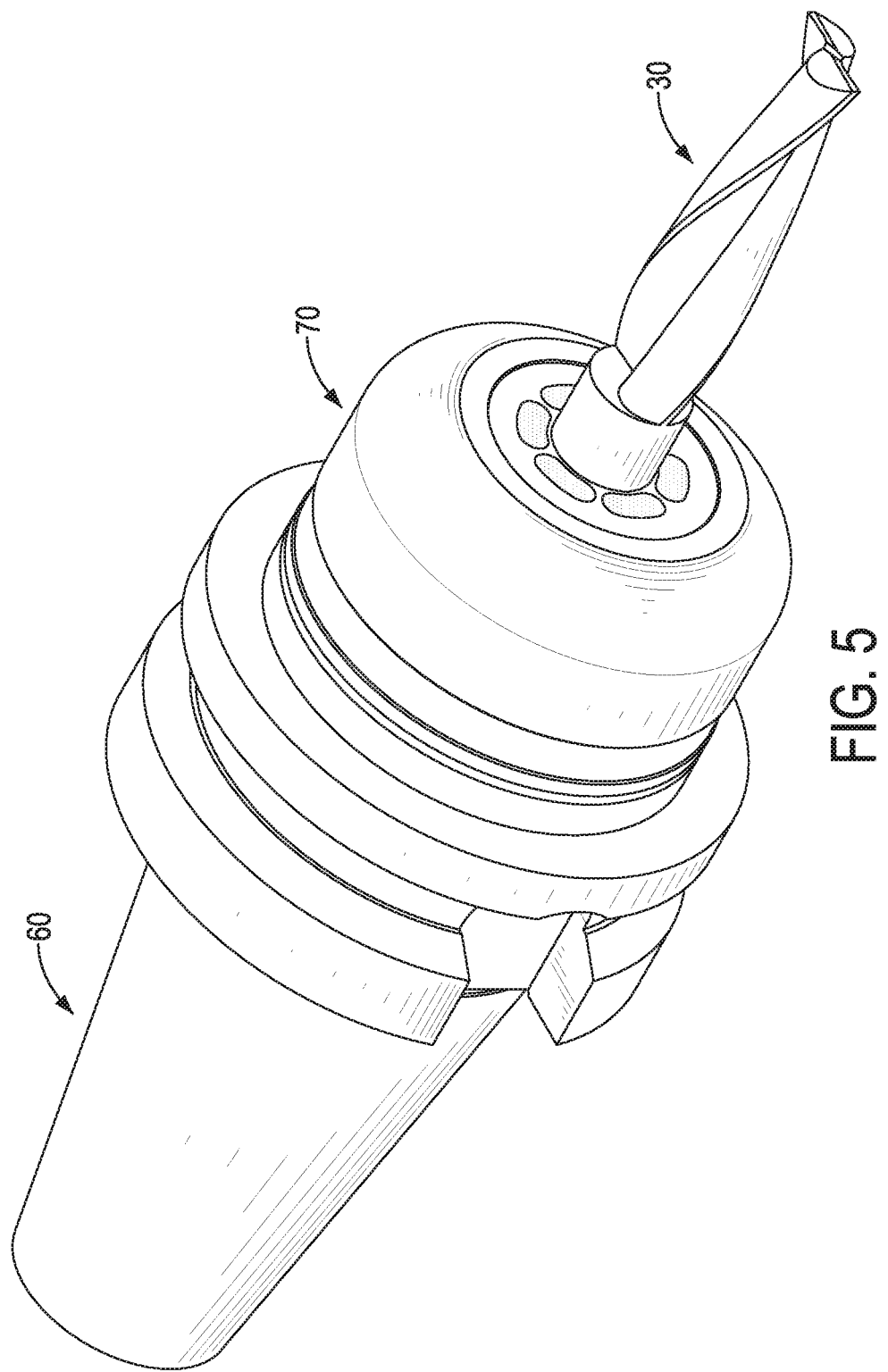
FIG. 5 is an operational perspective view of the collet assembly of improved stability in FIG. 1 connected to a cutter holder.
Figure 6:
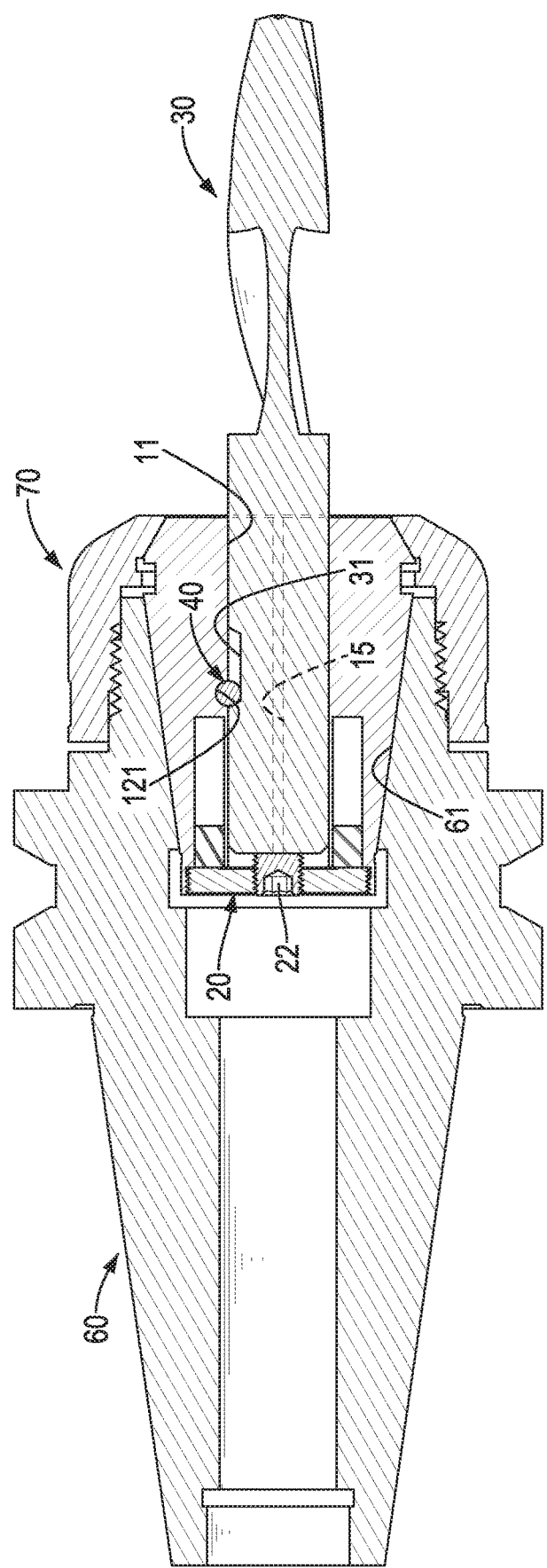
FIG. 6 is an operational cross-sectional side view of the collet assembly of improved stability in FIG. 1.

In use, with reference to FIGS. 5 and 6, extend the cutter 30 into the containing space 11 of the collet 10 until the mounting end of the cutter 30 abuts against the abutted element 22 of the axial limiting assembly 20. Then rotate the cutter 30 to a position where the limiting groove 31 communicates with the pin-receiving section 121 of the pin-receiving groove 12. Next, extend the pin 40 into the pin-receiving section 121 of the pin-receiving groove 12 and make the pin 40 abut against the end surface of the limiting groove 31 of the cutter 30. After the cutter 30 and the collet 10 are assembled, put the collet 10 into a positioning groove 61 of a cutter holder 60. At last, make a nut 70 pass through the collet 10 and mount the nut 70 to the cutter holder 60. Then the collet 10 clamps the cutter 30 tightly. Furthermore, the collet 10 is a water-outlet collet and has two coolant channels 15. In order to prevent high temperature of the collet assembly of improved stability in the machining process, the user can pour coolant into the cutter holder 60. The coolant then flows between the cutter 30 and the containing space 11 via the two coolant holes 212 of the end cap 21. The coolant flows out of the collet 10 through the two coolant channels 15.

Figure 7:
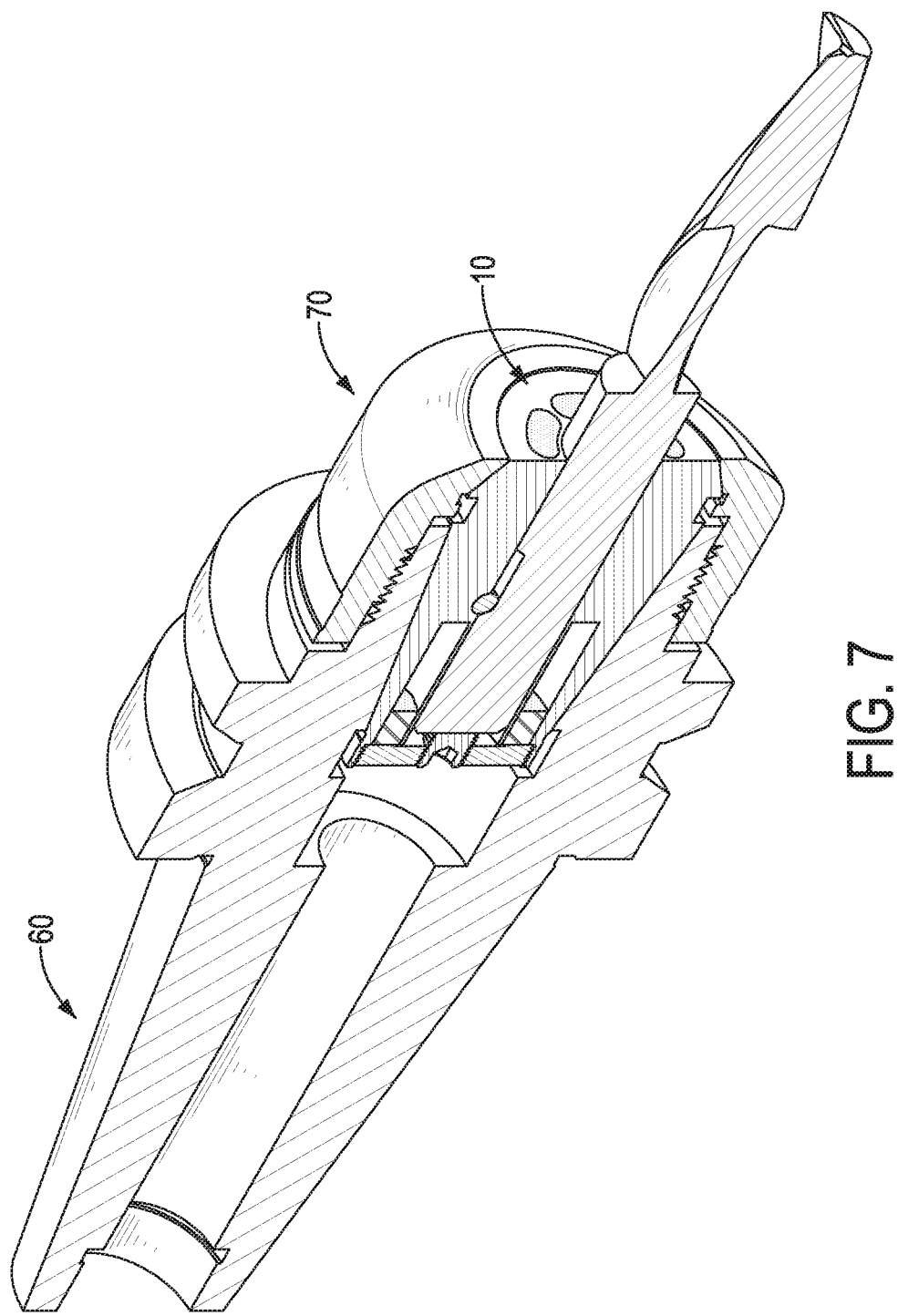
FIG. 7 is a cross-sectional perspective view of a second embodiment of a collet assembly of improved stability in accordance with the present invention.

With reference to FIG. 7, a second embodiment of a collet assembly of improved stability in accordance with the present invention is further provided, and the collet 10 is a sealing collet. The second embodiment of the collet assembly of improved stability is substantially the same as the first embodiment of the present invention, and the difference between the second embodiment and the first embodiment is that the collet 10 does not have the two coolant channels 15.

Overall, by having the cutter 30 abut against the abutted element 22 of the axial limiting assembly 20, the cutter 30 is not able to move along the axial direction of the collet 10 toward the first end surface 101 of the collet 10 in the machining process. The pin 40 extends into the pin-receiving section 121 of the pin-receiving groove 12 and abuts against the end surface of the limiting groove 31 of the cutter 30, such that the pin 40 limits movement of the cutter 30 and prevents the cutter 30 from rotating in the machining process. Moreover, each one of the multiple damping elements 50 capable of providing a shock-absorbing effect to the collet assembly can prevent vibrations of the collet 10 that may lower the machining accuracy of the cutter 30 in the machining process. By limiting axial movement and rotation of the cutter 30 and preventing the vibrations of the collet 10 that may lower the machining accuracy of the cutter 30, the present invention provides the collet assembly of improved stability.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A collet assembly of improved stability comprising:
    a collet having
        a containing space formed through the collet along an axial direction of the collet;
        a pin-receiving groove formed through the collet along a radial direction of the collet and communicating with the containing space;
        a connecting groove recessed on a first end surface of the collet along the axial direction of the collet and communicating with the containing space; and
        multiple receiving grooves recessed in the collet along the axial direction of the collet;
    an axial limiting assembly detachably mounted to the connecting groove of the collet and having
        an end cap detachably mounted to the connecting groove of the collet and having
            a containing hole formed through the end cap and communicating with the containing space of the collet; and
            two coolant holes formed through the end cap and communicating with the containing space of the collet; and
        an abutted element mounted to the containing hole of the end cap, and extending into the containing space of the collet;
    a cutter having
        a limiting groove recessed on the cutter and communicating with the pin-receiving groove of the collet and having an end surface disposed at one side of the limiting groove; and
        a mounting end abutting against the abutted element of the axial limiting assembly;
    a pin extending into the pin-receiving groove of the collet and abutting against the end surface of the limiting groove of the cutter; and
    multiple damping elements, each one of the multiple damping elements received in a respective one of the multiple receiving grooves of the collet.

2. The collet assembly of improved stability as claimed in claim 1, wherein
    the collet has a second end surface, and the first end surface and the second end surface are disposed at two ends of the collet respectively;
    several ones of the multiple receiving grooves are recessed on the connecting groove along the axial direction of the collet, and surround the containing space; and
    the other ones of the multiple receiving grooves are recessed on the second end surface of the collet along the axial direction of the collet, and surround the containing space.

3. The collet assembly of improved stability as claimed in claim 1, wherein the abutted element is a thrust screw.

4. The collet assembly of improved stability as claimed in claim 3, wherein each one of the multiple damping elements is flexible.

5. The collet assembly of improved stability as claimed in claim 1, wherein each one of the multiple damping elements is flexible.

6. A collet of improved stability in cooperation with a cutter having a limiting groove recessed on the cutter and comprising:
    a containing space formed through the collet along an axial direction of the collet and being capable of containing the cutter;
    a pin-receiving groove formed through the collet along a radial direction of the collet and communicating with the containing space and the limiting groove of the cutter;
    a connecting groove recessed on a first end surface of the collet along the axial direction of the collet and communicating with the containing space;
    multiple receiving grooves recessed in the collet along the axial direction of the collet;
    an axial limiting assembly detachably mounted to the connecting groove of the collet and having
        an end cap detachably mounted to the connecting groove of the collet and having
            a containing hole formed through the end cap and communicating with the containing space of the collet; and
            two coolant holes formed through the end cap and communicating with the containing space of the collet; and
        an abutted element mounted to the containing hole of the end cap, and extending into the containing space of the collet;
    a pin extending into the pin-receiving groove of the collet and abutting against an end surface of the limiting groove disposed at one side of the limiting groove of the cutter; and
    multiple damping elements, each one of the multiple damping elements received in a respective one of the multiple receiving grooves of the collet.

7. The collet assembly of improved stability as claimed in claim 6, wherein
    the collet has a second end surface, and the first end surface and the second end surface are disposed at two ends of the collet respectively;
    several ones of the multiple receiving grooves are recessed on the connecting groove along the axial direction of the collet, and surround the containing space; and
    the other ones of the multiple receiving grooves are recessed on the second end surface of the collet along the axial direction of the collet, and surround the containing space.

8. The collet assembly of improved stability as claimed in claim 6, wherein the abutted element is a thrust screw.

9. The collet assembly of improved stability as claimed in claim 8, wherein each one of the multiple damping elements is flexible.

10. The collet assembly of improved stability as claimed in claim 6, wherein each one of the multiple damping elements is flexible.

* * * * *